United States Patent
Miyanaga et al.

(10) Patent No.: US 9,025,627 B2
(45) Date of Patent: May 5, 2015

(54) LASER DEVICE

(71) Applicants: Osaka University, Suita-shi, Osaka (JP); Hamamatsu Photonics K.K., Hamamatsu-shi, Shizuoka (JP)

(72) Inventors: Noriaki Miyanaga, Suita (JP); Takashi Kurita, Hamamatsu (JP); Toshiyuki Kawashima, Hamamatsu (JP)

(73) Assignees: Osaka University, Suita-shi, Osaka (JP); Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/380,780

(22) PCT Filed: Dec. 28, 2012

(86) PCT No.: PCT/JP2012/084194
§ 371 (c)(1),
(2) Date: Aug. 25, 2014

(87) PCT Pub. No.: WO2013/128780
PCT Pub. Date: Sep. 6, 2013

(65) Prior Publication Data
US 2015/0023375 A1    Jan. 22, 2015

(30) Foreign Application Priority Data

Feb. 27, 2012    (JP) .................................. 2012-040447

(51) Int. Cl.
*H01S 3/10*    (2006.01)
*H01S 3/11*    (2006.01)
(52) U.S. Cl.
CPC .................................... *H01S 3/1106* (2013.01)
(58) Field of Classification Search
USPC ............................................... 372/25, 23, 21
See application file for complete search history.

(56) References Cited

U.S. PATENT DOCUMENTS

| 2005/0128554 A1* | 6/2005 | Wickham et al. ............. 359/237 |
| 2013/0163624 A1* | 6/2013 | Miyanaga et al. ............. 372/26 |

FOREIGN PATENT DOCUMENTS

| JP | H06-90050 A | 3/1994 |
| JP | 2005-294409 A | 10/2005 |

(Continued)

OTHER PUBLICATIONS

Jérôme Paye, "Measurement of the amplitude and phase of ultrashort light pulses from spectrally resolved autocorrelation," Optics Letters, Nov. 15, 1993, pp. 1946-1948, vol. 18, No. 22.

Pierre Tournois, "Acousto-optic programmable dispersive filter for adaptive compensation of group delay time dispersion in laser systems," Elsevier Science B.V., Optics Communication, Aug. 1, 1997, pp. 245-249.

(Continued)

*Primary Examiner* — Kinam Park
(74) *Attorney, Agent, or Firm* — Drinker Biddle & Reath LLP

(57) ABSTRACT

A laser device 1 demultiplexes seed light $L_0$ into a plurality of beams of laser light $L_1$ and then continuously optically amplifies the plurality of beams of the laser light $L_1$ with an amplifier 14. Therefore, its amplification factor can be set higher than that in the case of amplifying pulsed laser light. When producing multiplexed light $L_3$ by multiplexing the beams of the amplified laser light $L_1$ with a diffraction grating 16, respective phases of the beams of the laser light $L_1$ are controlled such that an output peak of the multiplexed light $L_3$ repeatedly appears at a converging position $P_1$ at a predetermined time interval. This produces pulsed laser light at the converging position $P_1$ from a plurality of beams of laser light $L_2$ amplified at a high amplification factor. Hence, this laser device 1 can produce pulsed laser light with a high output.

10 Claims, 10 Drawing Sheets

(56) References Cited

FOREIGN PATENT DOCUMENTS

| | | |
|---|---|---|
| JP | 2007-514305 A | 5/2007 |
| JP | 2011-203648 A | 10/2011 |
| JP | 2012-078813 A | 4/2012 |

OTHER PUBLICATIONS

English-language translation of International Preliminary Report on Patentability (IPRP) dated Sep. 12, 2014 that issued in WO Patent Application No. PCT/JP2012/084194.

* cited by examiner

*Fig.8*
(a)
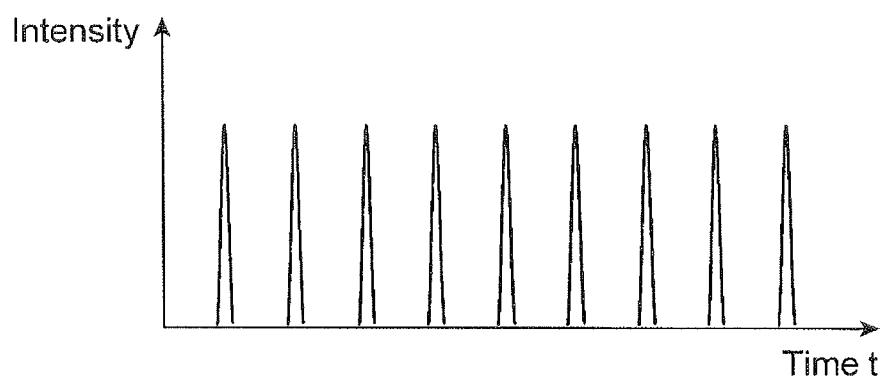
(b)
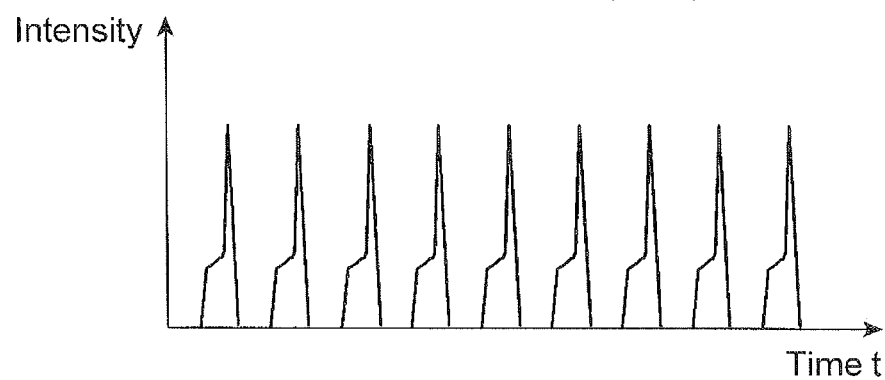

LASER DEVICE

TECHNICAL FIELD

The present invention relates to a laser device which produces pulsed laser light.

BACKGROUND ART

As the prior art in the technical field mentioned above, a mode-locked laser device disclosed in Patent Literature 1 has been known, for example. In the mode-locked laser device disclosed in Patent Literature 1, laser light modulated at a frequency which is an integer multiple of a frequency interval of a longitudinal mode occurring in a laser light resonator is amplified by a plurality of amplifiers (e.g., optical fiber amplifiers) having gains in respective spectral regions whose center wavelengths are different from each other, so as to produce a plurality of wavelength regions of pulsed laser light at once.

CITATION LIST

Patent Literature

Patent Literature 1: Japanese Patent Application Laid-Open No. H06-90050

SUMMARY OF INVENTION

Technical Problem

Meanwhile, pulsed laser light exhibits a peak light intensity higher than that of continuous light having the same energy per unit time, i.e., average power. Therefore, when amplifying the pulsed laser light, it is necessary to limit the amplification factor in order to prevent amplifiers from being damaged. This makes it difficult for the laser device amplifying pulsed laser light to produce pulsed laser light with a high output.

In view of such circumstances, it is an object of the present invention to provide a laser device which can produce pulsed laser light with a high output.

Solution to Problem

One aspect of the present invention relates to a laser device. This laser device comprises oscillation means for oscillating a laser pulse train constituted by a plurality of beams of continuous laser light having frequencies different from each other; demultiplexing means for demultiplexing the laser pulse train oscillated from the oscillation means into a plurality of beams of the continuous laser light having frequencies different from each other; amplification means for amplifying each of the beams of the continuous laser light demultiplexed by the demultiplexing means; multiplexing means for multiplexing at a predetermined position the beams of the continuous laser light amplified by the amplification means, so as to produce multiplexed light; and phase control means for controlling a phase of each of the beams of the continuous laser light such that an output peak of the multiplexed light repeatedly appears at the predetermined position at a predetermined time interval; while the amplification means includes a pumping light source for oscillating pumping light and a nonlinear crystal for receiving each of the beams of the continuous laser light and pumping light and makes each of beams of the continuous laser light and the pumping light incident on the nonlinear crystal such as to satisfy a phase-matching condition of optical parametric amplification, thereby amplifying each of the beams of the continuous laser light.

In this laser device, after a laser pulse train is demultiplexed into a plurality of beams of continuous laser light, each of the beams of the continuous laser light is amplified by amplification means. Therefore, the amplification factor can be set higher than that in the case of amplifying pulsed laser light. When multiplexing thus amplified beams of continuous laser light at a predetermined position so as to produce multiplexed light, the phase of each of beams of the continuous laser light is controlled such that an output peak of the multiplexed light repeatedly appears at the predetermined position at a predetermined time interval. As a consequence, pulsed laser light is produced at the predetermined position by a plurality of beams of amplified continuous laser light. Therefore, this laser device can produce pulsed laser light with a high output. In particular, this laser device employs optical parametric amplification by a nonlinear crystal. Hence, this laser device can perform amplification over a wide wavelength band by selecting the wavelength of pumping light, an angle at which the pumping light and continuous laser light intersect, and the like.

In the laser device in accordance with one aspect of the present invention, the amplification means may make the pumping light incident on the nonlinear crystal as convergent light or divergent light. This can enlarge the range of wavelength satisfying the phase-matching condition of phase parametric amplification.

In the laser device in accordance with one aspect of the present invention, the amplification means may make a plurality of beams of pumping light incident on the nonlinear crystal for one beam of continuous laser light. In this case, one beam of continuous laser light is amplified by using a plurality of beams of pumping light, whereby pulsed laser light with a higher output can be obtained.

The laser device in accordance with one aspect of the present invention may be constructed such that the nonlinear crystal includes a plurality of nonlinear crystal parts and that the amplification means makes one beam of continuous laser light incident on the nonlinear crystal over a plurality of nonlinear crystal parts and a plurality of beams of pumping light incident on the nonlinear crystal for each of the nonlinear crystal parts. In this case, even when the intensity of the pumping light incident on each nonlinear crystal part is suppressed in order to prevent laser damages from occurring in the nonlinear crystal parts, the amplified continuous laser light can attain a higher output by increasing the number of nonlinear crystal parts.

In the laser device in accordance with one aspect of the present invention, the oscillation means may oscillate the laser pulse train constituted by beams of continuous laser light having frequencies different from each other at a substantially fixed frequency interval. This makes it easier to control the phase such that the output peak of the multiplexed light repeatedly appears at the predetermined position at the predetermined time interval. Hence, pulsed laser light can easily be produced with a high output.

The laser device in accordance with one aspect of the present invention may further comprise frequency difference adjustment means for adjusting a frequency difference between the beams of continuous laser light constituting the laser pulse train oscillated from the oscillation means. In this case, adjusting the frequency difference between the beams of continuous laser light can regulate the repetition rate of the pulsed laser light to be produced.

In the laser device in accordance with one aspect of the present invention, the oscillation means may be a mode-locked oscillator or a semiconductor laser under high speed current modulation. This can reduce the size, weight, and power consumption of the laser device. It can also improve the mechanical stability of the laser device. It can further cut down the manufacture cost of the laser device.

In the laser device in accordance with one aspect of the present invention, the phase control means may measure a spectral phase of the multiplexed light and control respective phases of beams of the continuous laser light according to a result of the measurement. In this case, providing a spectral phase modulator in front of the demultiplexing means, for example, can make it easy to control the respective phases of beams of the continuous laser light.

Advantageous Effects of Invention

The present invention can provide a laser device which can produce pulsed laser light with a high output.

BRIEF DESCRIPTION OF DRAWINGS

FIG. 8 is a set of charts for explaining modified examples of the laser device illustrated in FIGS. 2 and 7;

DESCRIPTION OF EMBODIMENTS

Figure 1:
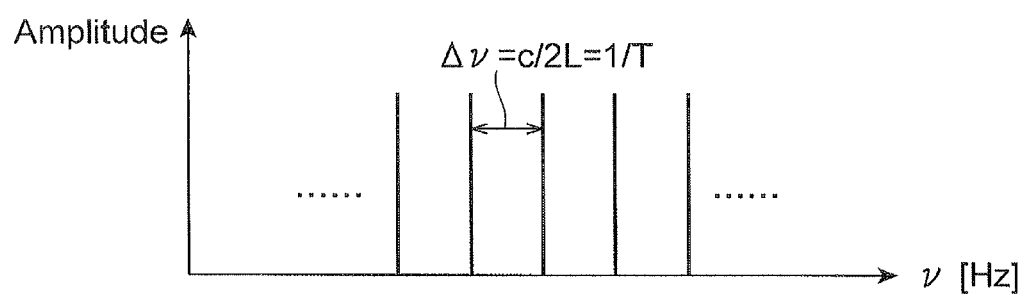
FIG. 1 is a graph for explaining an optical frequency comb.

In the following, embodiments of the laser device in accordance with one aspect of the present invention will be explained in detail with reference to the drawings. In the drawings, the same or equivalent constituents will be referred to with the same signs while omitting their overlapping descriptions.

The laser devices in accordance with the embodiments use, as a laser light source, a mode-locked laser which actualizes an optical frequency comb. Therefore, the optical frequency comb and mode-lock oscillation will first be explained.

A plurality of longitudinal-mode laser light beams exist within a Fabry-Perot resonator, for example. The respective frequencies of the longitudinal-mode laser light beams are arranged at intervals of $\Delta v = c/2L$, where L is the resonator length (c is the speed of light), on the frequency axis as illustrated in FIG. 1. A state where the respective frequencies of laser light beams are thus arranged at equally-spaced intervals is referred to as optical frequency comb. Unless each laser light beam is phase-modulated, the laser light beams have random phase intervals therebetween in a laser light source equipped with such a resonator, thereby constructing multiplexed light as output light of the laser light source exhibiting random output temporal waveforms. When the laser light beams in such a laser light source are phase-modulated by using a saturable absorber element, an electro-optical modulator, or an acousto-optic modulator so as to have phases matching each other, on the other hand, the output light has a pulsed output temporal waveform at a repetition period T ($T=1/\Delta v$), thereby yielding mode-locked oscillation. Such oscillation means may also be a light source such as a high-frequency current-modulated semiconductor laser in which short pulses repeatedly appear at predetermined time intervals.

First Embodiment

Figure 2:
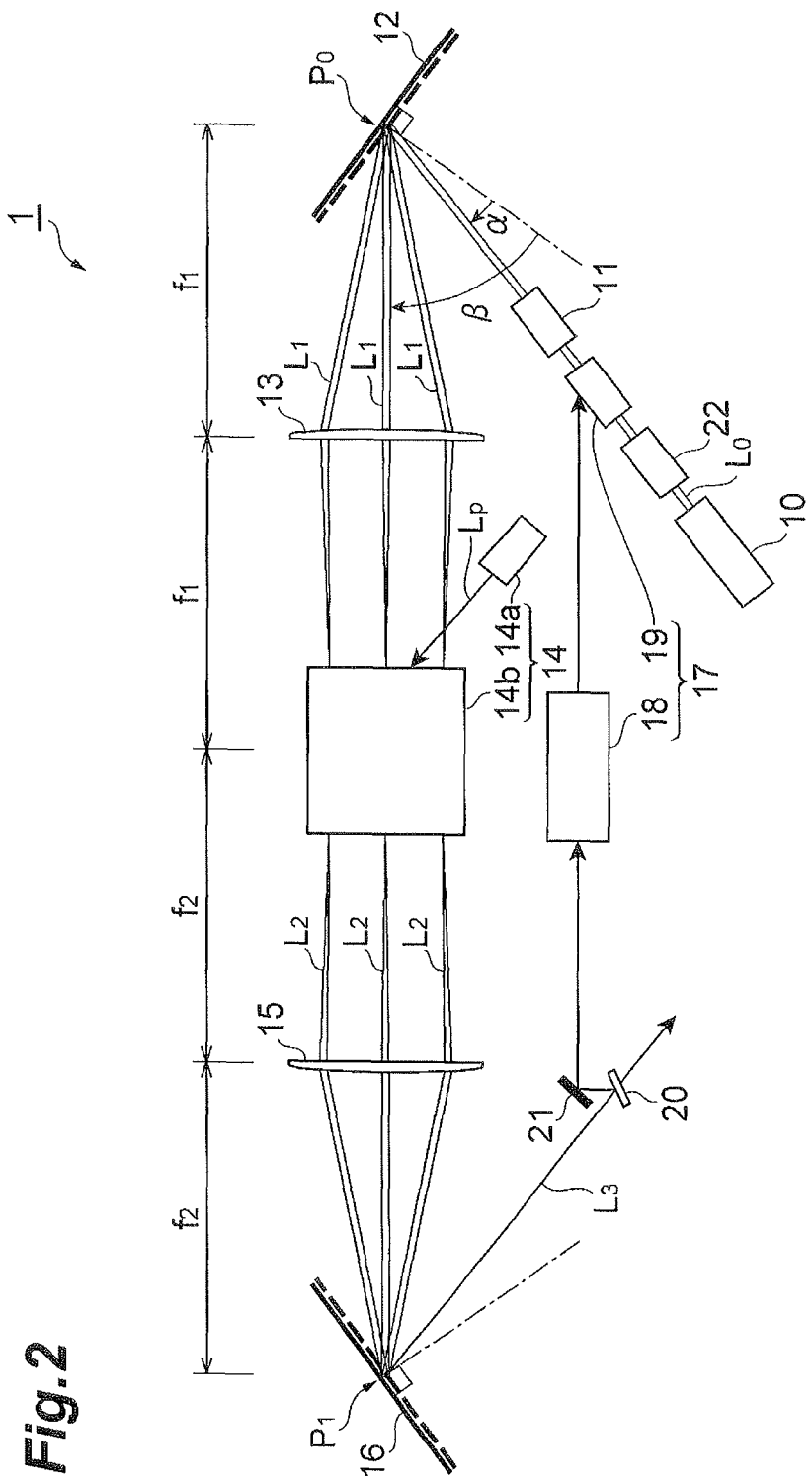
FIG. 2 is a diagram illustrating a schematic structure of a first embodiment of the laser device in accordance with one aspect of the present invention.

FIG. 2 is a diagram illustrating a schematic structure of the first embodiment of the laser device in accordance with one aspect of the present invention. As illustrated in FIG. 2, the laser device 1 in accordance with this embodiment comprises a laser light source (oscillation means) 10 such as a mode-locked laser which actualizes the optical frequency comb as mentioned above or a semiconductor laser under high repetition current modulation. Seed light $L_0$, which is output light of the laser light source 10, is pulsed light (laser pulse train) constituted by a plurality of beams of continuous laser light (laser light $L_1$) having frequencies different from each other by a fixed frequency difference and the same phase. Here, the continuous laser light is one whose output is substantially constant with time, while pulsed laser light is one whose output peak repeatedly appears at a predetermined time interval.

The laser device 1 further comprises an optical isolator 11 and a diffraction grating (demultiplexing means) 12 which are arranged sequentially on an optical path of the seed light $L_0$ oscillated from the laser light source 10. The optical isolator 11 prevents light from returning to the laser light source 10. The diffraction grating 12 demultiplexes the seed light $L_0$ into a plurality of (3 here) beams of laser light $L_1$ for the respective frequencies. That is, the diffraction grating 12 demultiplexes the laser pulse train oscillated from the laser light source 10 into a plurality of beams of laser light $L_1$ having frequencies different from each other. In other words, the diffraction grating 12 angularly disperses the optical frequency comb in the seed light $L_0$. In still other words, the diffraction grating 12 spatially arranges the plurality of beams of laser light $L_1$ constituting the seed light $L_0$ for the respective frequencies. Here, the beams of laser light $L_1$ are spatially arranged in the order of their frequencies.

The laser device 1 further comprises a lens 13 arranged on an optical path of the beams of laser light $L_1$ demultiplexed by the diffraction grating 12. The lens 13 has a focal length $f_1$ and is arranged at a position separated by the distance $f_1$ from a position $P_0$ at which the seed light $L_0$ is incident on the diffraction grating 12. Therefore, by passing through the lens 13, the beams of laser light $L_1$ demultiplexed by the diffraction grating 12 advance in parallel with each other at predetermined intervals $\Delta x$ therebetween and each converge at a position separated by the distance $f_1$ from the lens 13.

Figure 3:
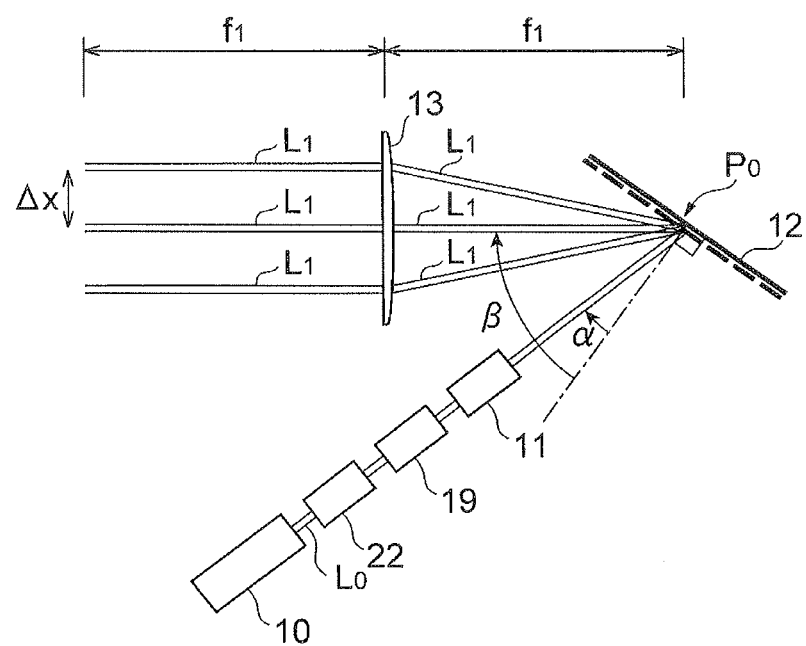
FIG. 3 is an enlarged view of a part of the laser device illustrated in FIG. 2.

The interval $\Delta x$ between the beams of laser light $L_1$ adjacent to each other can be determined as follows, for example. That is, as illustrated in FIG. 3, letting $\beta$ be the angle of diffraction of a predetermined beam of the laser light $L_1$ at a wavelength $\lambda$, m be the order of diffraction (the first-order diffraction (m=1) is usually used), N be the number of grooves per 1 m of the diffraction grating 12, and d be the groove interval (1/N) of the diffraction grating 12, the angular dispersion dβ/dλ, of the diffraction grating 12 is expressed by:

$$\frac{d\beta}{d\lambda} = \frac{mN}{\cos\beta} = \frac{m}{d\,\cos\beta} \quad [\text{Math. 1}]$$

The reciprocal linear dispersion dλ/dx is expressed by:

$$\frac{d\lambda}{dx} = \frac{d\,\cos\beta}{m \cdot f_1} \quad [\text{Math. 2}]$$

Hence, letting Δλ be the wavelength interval between the beams of laser light $L_1$ adjacent to each other, the interval Δx between the adjacent beams of laser light $L_1$ is determined by:

$$\Delta x = \frac{dx}{d\lambda}\Delta\lambda = \frac{m \cdot f_1}{d\,\cos\beta}\Delta\lambda \quad [\text{Math. 3}]$$

More specifically, when the focal length $f_1$ of the lens 13 is 1 m, the number of grooves N is 1200 g/mm, and the angle of incidence α of the seed light $L_0$ on the diffraction grating 12 is 20 deg, if the center wavelength of the laser light $L_1$ is 1060 nm, its angle of diffraction β will be 68.43 deg. In this case, Δx becomes 1.22 μm, 122 μm, and 1.22 mm when the wavelength interval Δλ is 0.375 μm, 37.5 μm, and 0.375 nm, respectively.

The laser device 1 will further be explained with reference to FIG. 2. As illustrated in FIG. 2, the laser device 1 further comprises an amplifier (amplification means) 14 partly arranged on an optical path of the laser light $L_1$ having passed through the lens 13. The amplifier 14 receives and amplifies the beams of laser light $L_1$ having passed through the lens 13 and outputs them as beams of laser light $L_2$. That is, the amplifier 14 amplifies each of the beams of laser light $L_1$ demultiplexed by the diffraction grating 12. In the following, the amplifier 14 will be explained in detail.

For amplifying each of the beams of laser light $L_1$ by optical parametric amplification, the amplifier 14 has a pumping light source 14a for oscillating pumping light $L_p$ and a nonlinear crystal 14b on which the laser light $L_1$ and pumping light $L_p$ are incident. The optical parametric amplification in the amplifier 14 is an amplification scheme using a second-order nonlinear optical effect in the nonlinear crystal 14b, in which the laser light $L_1$ is amplified by a process of distributing the energy of the pumping light $L_p$ into the laser light $L_1$ and idler light (not depicted). In other words, the amplifier 14 amplifies each of the beams of laser light $L_1$ by making each of the beams of laser light $L_1$ and pumping light $L_p$ incident on the nonlinear crystal 14b such as to satisfy a phase-matching condition of the optical parametric amplification.

FIGS. 4(a) and 4(b) are side and top plan views of the nonlinear crystal 14b. As illustrated in FIGS. 4(a) and 4(b), one beam of pumping light $L_p$ is incident on the nonlinear crystal 14b for one beam of the laser light $L_1$. The nonlinear crystal 14b has been cut and polished beforehand at such an angle (phase-matching angle φ) that the beams of laser light $L_1$ dispersed by the diffraction grating 12 and beams of the pumping light $L_p$ satisfy a phase-matching condition. As illustrated in FIG. 4(b), the laser light $L_1$ and pumping light $L_p$ are incident on the nonlinear crystal 14b coaxially or with an intersection angle ψ of several degrees. As a consequence, the laser light $L_1$ is amplified during when the pumping light $L_p$ propagates through the nonlinear crystal 14b, and then outputted.

Figure 4:
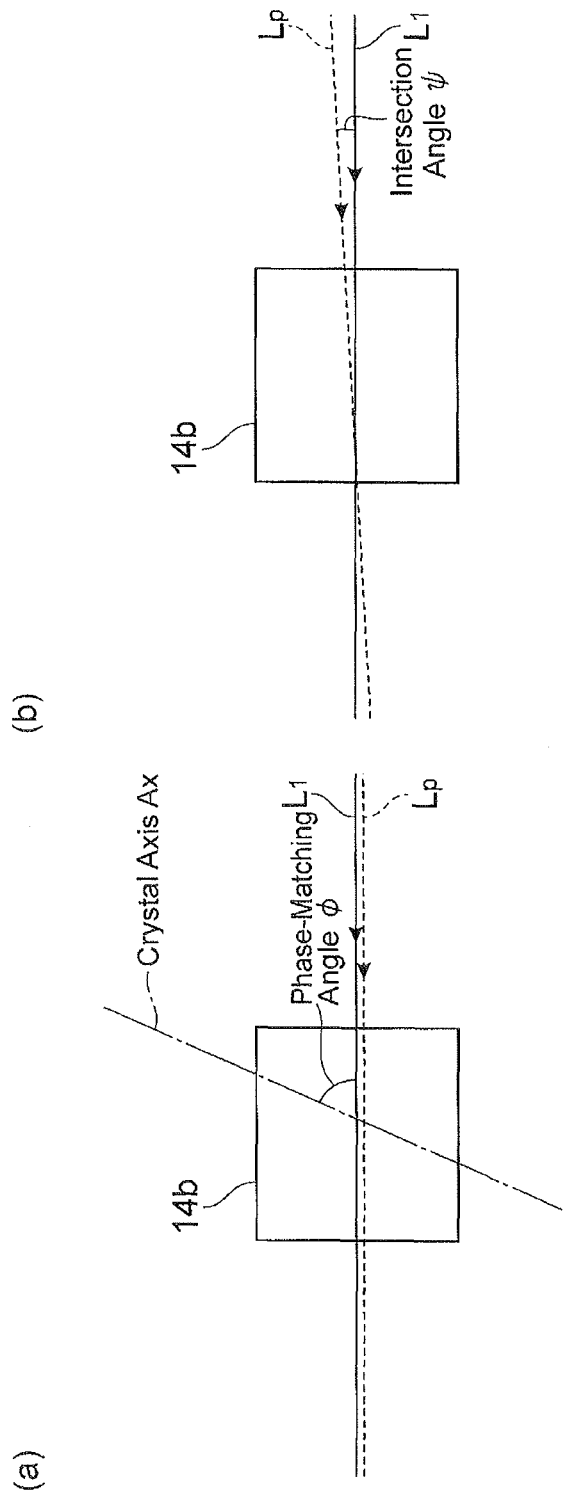
FIG. 4 is a set of diagrams for explaining an amplifier illustrated in FIG. 2.
Figure 5:
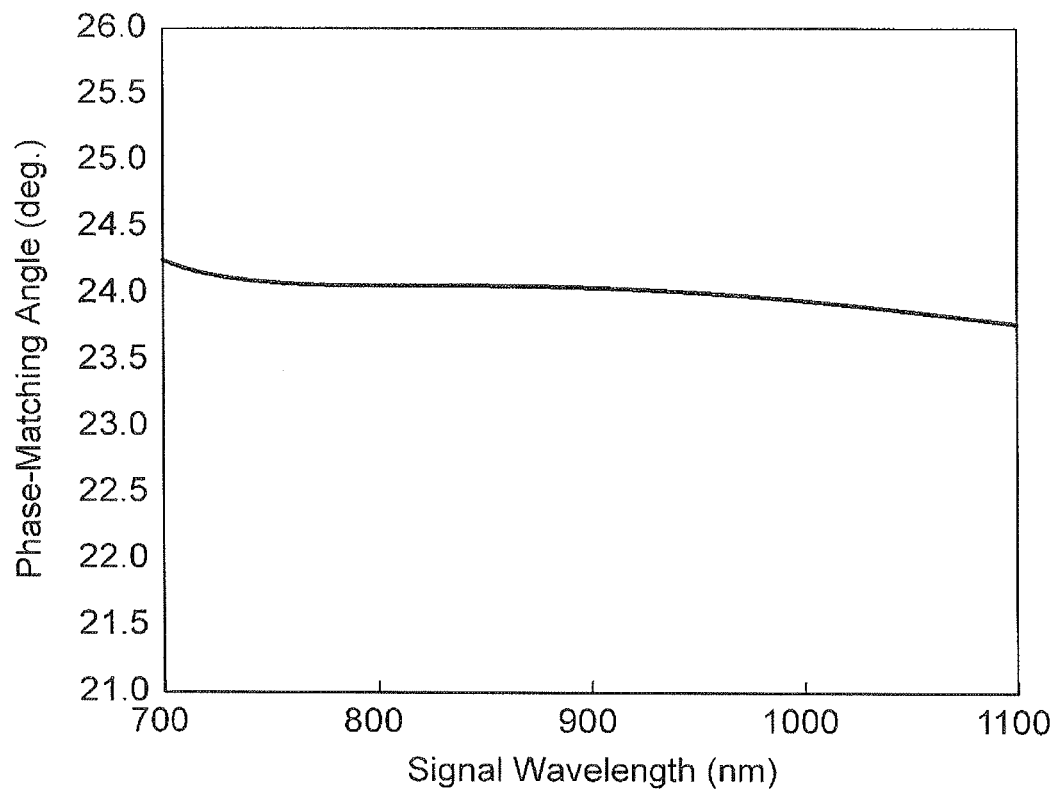
FIG. 5 is a graph for explaining the amplifier illustrated in FIG. 2.

More specific explanations will now be given with reference to FIGS. 4 and 5. In the case using a beta barium borate (BBQ) crystal of Type 1 as the nonlinear crystal 14b, optical axis adjustment is performed such that, when the wavelength of the pumping light $L_p$ and the center wavelength of the laser light $L_1$ are 527 nm and 800 nm, respectively, the angle (phase-matching angle φ) between the axis of incidence of the pumping light $L_p$ onto the nonlinear crystal 14b and the crystal axis Ax of the nonlinear crystal 14b is about 24.1° while the angle (intersection angle ψ) between the pumping light $L_p$ and the laser light $L_1$ is about 2.5°. As a result, a relationship (phase-matching curve) between the wavelength of laser light $L_1$ (signal wavelength) and the phase-matching angle φ is obtained as illustrated in FIG. 5.

This makes the phase-matching characteristic substantially fixed at about 24° when the wavelength of the laser light $L_1$ falls within the range of about 750 to 1050 nm. When the laser laser light $L_1$ and the pumping light $L_p$ are incident on the nonlinear crystal 14b at substantially the same time, each beam of the laser laser light $L_1$ is amplified. As the nonlinear crystal 14b, not only the above-mentioned BBO, but crystals such as those of potassium dihydrogen phosphate (KDP) and partially deuterated KDP (DKDP) may also be used, for example. The pumping light $L_p$ may be incident on the nonlinear crystal 14b not only as parallel light but also as convergent or divergent light. Making the pumping light $L_p$ incident as the convergent light or divergent light on the nonlinear crystal 14b can enlarge the range of wavelength satisfying the phase-matching condition of phase parametric amplification.

Referring to FIG. 2 again, the laser device 1 will be explained more. As illustrated in FIG. 2, the laser device 1 further comprises a lens (multiplexing means) 15 and a diffraction grating (multiplexing means) 16 which are arranged sequentially on an optical path of the laser light $L_2$ emitted from the amplifier 14 (nonlinear crystal 14b). The lens 15 has a focal length $f_2$ and is arranged at a position separated by the distance $f_2$ from a substantially center position of the nonlinear crystal 14b. The diffraction grating 16 is arranged at a position separated by the distance $f_2$ from the lens 15.

Therefore, each of beams of the laser light $L_2$ emitted from the nonlinear crystal 14b passes through the lens 15, thereby converging at a converging position $P_1$ of the diffraction grating 16. As a result, the beams of laser light $L_2$ emitted from the nonlinear crystal 14b are multiplexed at the converging position $P_1$, so as to produce mutiplexed light $L_3$ as output light of the laser device 1. Here, the focal length $f_2$ of the lens 15 and the groove density of the diffraction grating 16 may be made different from the focal length $f_1$ of the lens 13 and the groove density of the diffraction grating 12 such that the mutiplexed light $L_3$, which is a parallel beam, has a desirable beam diameter.

The laser device 1 further comprises a phase control unit (phase control means) 17. The phase control unit 17 controls the respective phases of beams of the laser light $L_1$ constituting the seed light $L_0$ such that an output peak of the multiplexed light $L_3$ repeatedly appears at the converging position $P_1$ of the diffraction grating 16 at a predetermined time interval (i.e., the same pulse temporal waveform repeatedly appears at a predetermined time interval). The phase control will be explained more specifically.

The phase control unit 17 has a spectral phase measurement device (such as FROG described in J. Paye et al., Opt. Lett. 18, 1946-1948 (1993)) 18 and a spectral phase modulator (e.g., a 4f optical system constructed by a diffraction grating and a liquid-crystal spatial modulator or an acousto-optic programmable dispersive filter described in P. Tournois et al., Opt. Commu. 140, 245-249 (1997)) 19. The laser device 1 is also provided with a half mirror 20 for splitting off a part of the multiplexed light $L_3$ and a mirror 21 for guiding the part of the multiplexed light $L_3$ split by the half mirror 20 to the spectral phase measurement device 18.

Thus constructed phase control unit 17 controls the respective phases of beams of the laser light $L_1$ constituting the seed light $L_0$ as follows. That is, in the phase control unit 17, a part of the multiplexed light $L_3$ is inputted to the spectral phase measurement device 18 by way of the half mirror 20 and mirror 21. The spectral phase measurement device 18 measures the spectral phase (phase changed during the shift from the position $P_0$ to position $P_1$) of the inputted multiplexed light $L_3$. The spectral phase measurement device 18 transmits (feeds back) information indicating results of the measurement to the spectral phase modulator 19.

Then, according to the information indicating the results of measurement from the spectral phase measurement device 18, the spectral phase modulator 19 controls the respective phases of beams of the laser light $L_1$ constituting the seed light $L_0$ such that the output peak of the multiplexed light $L_3$ repeatedly appears at a predetermined time interval (i.e., the same pulse temporal waveform repeatedly appears at a predetermined time interval). That is, the phase control unit 17 measures the spectral phase of the multiplexed light $L_3$ and, according to results of the measurement, controls the respective phases of beams of the laser light $L_1$ (and eventually the respective phases of beams of the laser light $L_2$).

Thus, the phase control unit 17 controls the phases of a plurality of beams of the continuous laser light $L_1$ constituting the seed light $L_0$ and having frequencies different from each other (corrects for each frequency the change in phase added during the shift from the position $P_0$ to position $P_1$), whereby the multiplexed light $L_3$ produced by the diffraction grating 16 becomes pulsed laser light having an enhanced peak intensity while being equivalent to the laser light of the optical frequency comb oscillated in the mode-locked manner.

Figure 6:
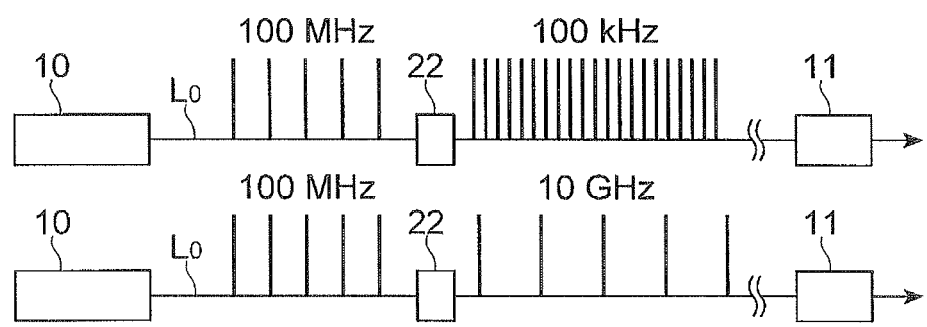
FIG. 6 is a diagram for explaining an operation of a frequency modulator illustrated in FIG. 2.

The laser device 1 further comprises a frequency modulator (frequency adjustment means) 22 arranged in front of the optical isolator 11 on an optical path of the seed light $L_0$. The frequency modulator 22 adjusts frequency differences between the beams of laser light $L_1$ constituting the seed light $L_0$. Hence, as illustrated in FIG. 6, the frequency interval between the beams of laser light $L_1$ constituting the seed light $L_0$ (optical frequency comb interval) may be made integer times smaller or larger than the original, e.g., changed to 100 kHz or 10 GHz from 100 MHz.

As a result, the interval $\Delta x$ between the beams of laser light $L_1$ demultiplexed and spatially arranged by the diffraction grating 12 can be adjusted arbitrarily. The pulse repetition rate of the multiplexed light $L_3$ may be made variable as demanded by applications. The frequency modulator 22 may be constituted by a mirror pair or an LN (lithium niobate) modulator. As the spectral phase modulator 19, one which can modulate both amplitude and phase may be used for enhancing the repetition of the multiplexed light $L_3$.

First, in thus constructed laser device 1, the seed light $L_0$ is oscillated from the laser light source 10. The seed light $L_0$ oscillated from the laser light source 10 passes through the spectral phase modulator 19 and optical isolator 11, so as to reach the diffraction grating 12. The seed light $L_0$ having reached the diffraction grating 12 is demultiplexed thereby into a plurality of beams of laser light $L_1$ having respective frequencies. The respective phases of beams of the laser light $L_1$ are controlled by the spectral phase modulator 19 such that the multiplexed light $L_3$ to be produced later becomes pulsed laser light.

By passing through the lens 13, the beams of laser light $L_1$ demultiplexed by the diffraction grating 12 advance in parallel with each other and are made incident on the nonlinear crystal 14b of the amplifier 14. Here, the pumping light $L_p$ from the pumping light source 14a and the laser light $L_1$ are made incident on the nonlinear crystal 14b so as to satisfy the phase-matching condition of optical parametric amplification. As a consequence, the beams of laser light $L_1$ are amplified in the nonlinear crystal 14b and emitted therefrom as beams of the laser light $L_2$.

Each of the beams of laser light $L_2$ emitted from the nonlinear crystal 14b passes through the lens 15, so as to be converged onto the diffraction grating 16. The beams of laser light $L_2$ converged onto the diffraction grating 16 are multiplexed by the diffraction grating 16 and outputted as the multiplexed light $L_3$, which is pulsed laser light, from the laser device 1. Here, a part of the outputted multiplexed light $L_3$ is inputted to the spectral phase measurement device 18 of the phase control unit 17, so as to be used for measuring the spectral phase.

In the laser device 1 in accordance with this embodiment, as explained in the foregoing, the seed light $L_0$, which is a laser pulse train, is demultiplexed into a plurality of beams of laser light $L_1$, and then each of the beams of laser light $L_1$ is continuously optically amplified by the amplifier 14. Therefore, the amplification factor can be set higher than that in the case of amplifying pulsed laser light. When the diffraction grating 16 produces the multiplexed light $L_3$ by multiplexing the beams of amplified laser light $L_2$, the respective phases of beams of the laser light $L_1$ constituting the seed light $L_0$ are controlled such that the output peak of the multiplexed light $L_3$ repeatedly appears at the converging position $P_1$ at a predetermined time interval. As a consequence, pulsed laser light is produced at the converging position $P_1$ by a plurality of beams of the laser light $L_2$ amplified with a high amplification factor. Hence, this laser device 1 can produce pulsed laser light with a high output.

In particular, the laser device 1 in accordance with this embodiment employs optical parametric amplification by the nonlinear crystal 14b. This makes it possible for the laser device 1 to perform amplification over a wide wavelength band by selecting the wavelength of the pumping light $L_P$, the intersection angle $\psi$ between the pumping light $L_p$ and the laser light $L_1$, and the like.

The laser device 1 demultiplexes the seed light $L_0$, which is a laser pulse train, into beams of the laser light $L_1$, which are continuous laser light beams, continuously optically amplifies them, and then converts them again into a laser pulse train. Thus, the laser device 1 performs continuous optical amplification and consequently does not generate nonlinear optical effects (e.g., self-phase modulation and beam breakup) and narrowing of the bandwidth (an increase in pulse width) which may occur when amplifying pulsed laser light. Therefore, the laser device 1 can produce pulsed laser light with higher beam quality, higher repetition, and shorter pulses than laser devices for amplifying pulsed laser light.

Second Embodiment

Figure 7:
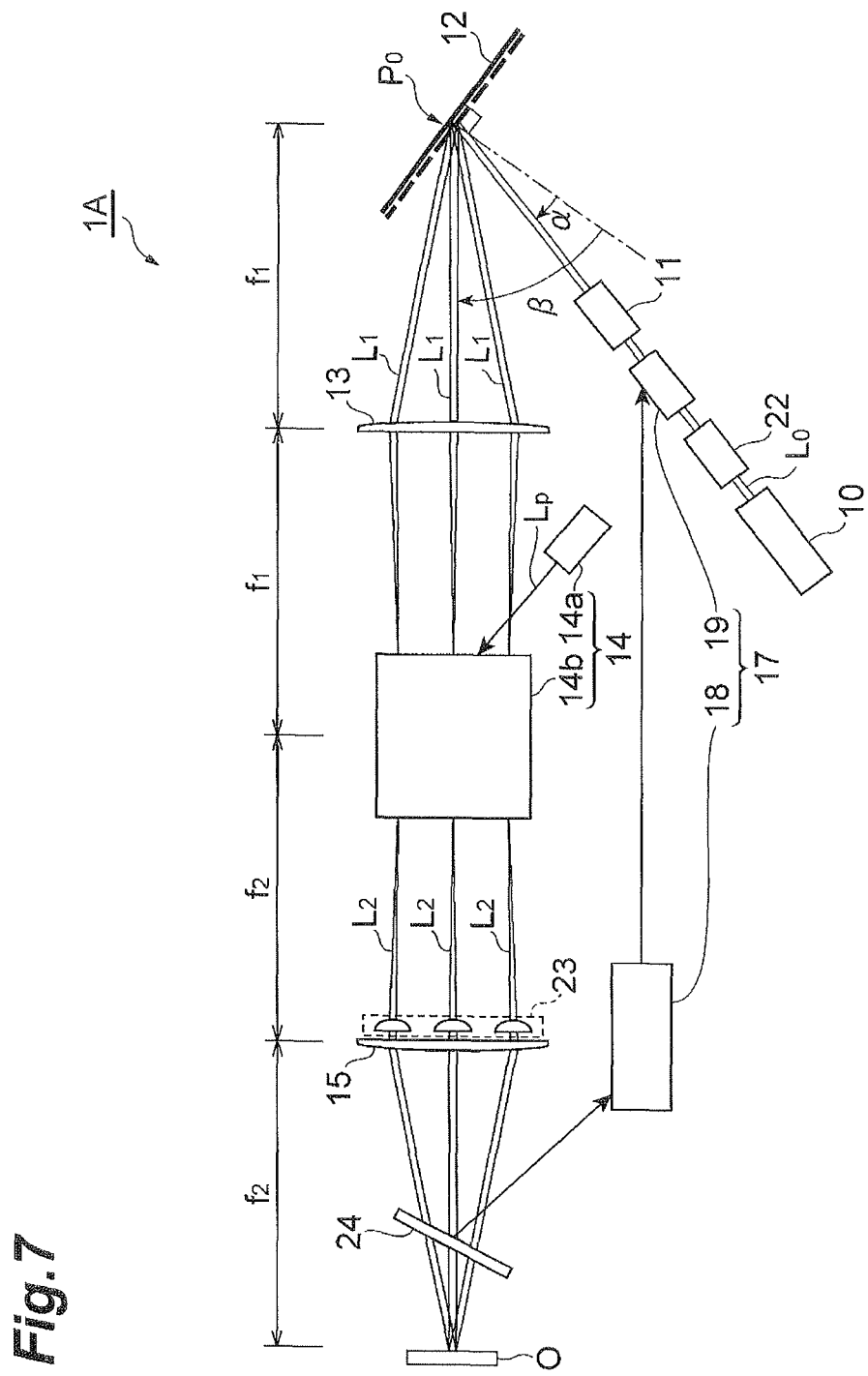
FIG. 7 is a diagram illustrating a schematic structure of a second embodiment of the laser device in accordance with one aspect of the present invention.

FIG. 7 is a diagram illustrating a schematic structure of the second embodiment of the laser device in accordance with one aspect of the present invention. As illustrated in FIG. 7, the laser device 1A in accordance with this embodiment differs from the laser device 1 in accordance with the first embodiment in that it comprises a convex or concave multilens array 23 and that it lacks the diffraction grating 16.

The multilens array 23 is arranged on the light entrance surface side of the lens 15 on an optical path of the laser light $L_2$. By using the multilens array 23, without the diffraction grating 16, the laser device 1A directly converges beams of the laser light $L_2$ onto an object to be processed O, thereby producing the multiplexed light $L_3$ at this position. Thus, the laser device 1A can be employed when not required to transmit the multiplexed light $L_3$. By adjusting the focal length of the multilens array 23, the laser device 1A can regulate the size of a converging spot on the object O.

In the laser device 1A, a half mirror 24 is arranged behind the lens 15, so as to split off a part of each of the beams of laser light $L_2$ and making it incident on the spectral phase measurement device 18. That is, in the laser device 1A, the phase control unit 17 measures the respective phases of beams of the laser light $L_2$ and, according to results of the measurement, controls the respective phases of beams of the laser light $L_1$ constituting the seed light $L_0$.

Thus constructed laser device 1A can produce pulsed laser with a high output because of the same reason as with the laser device 1. It can also produce pulsed laser light with high beam quality, high repetition, and short pulses.

The foregoing embodiments explain one mode of the laser device in accordance with one aspect of the present invention. Therefore, the laser device in accordance with the present invention is not limited to the above-mentioned laser devices 1, 1A. The laser device in accordance with the present invention may arbitrarily modify the above-mentioned laser devices 1, 1A within scopes not altering the gist of each claim.

For example, the respective phases of beams of the laser light $L_2$, which are amplified beams of the laser light $L_1$ having frequencies different from each other, may be controlled so as to become identical to each other or different from each other in each of the above-mentioned laser devices 1, 1A. Since the pulse temporal waveform and the spectral phase distribution have a complex Fourier transform relationship therebetween, adjusting the respective phases of beams of the laser light $L_2$, which are amplified beams of the laser light $L_1$ having frequencies different from each other, by using the phase control unit 17 (i.e., by using the spectral phase modulator 19) can yield a given pulse output waveform in the multiplexed light $L_3$ as illustrated in FIG. 8. That is, by controlling the phases of beams of the laser light $L_1$ (laser light $L_2$) having frequencies different from each other, the laser devices 1, 1A can variously regulate the temporal waveform of the laser pulse to be produced.

Figure 9:
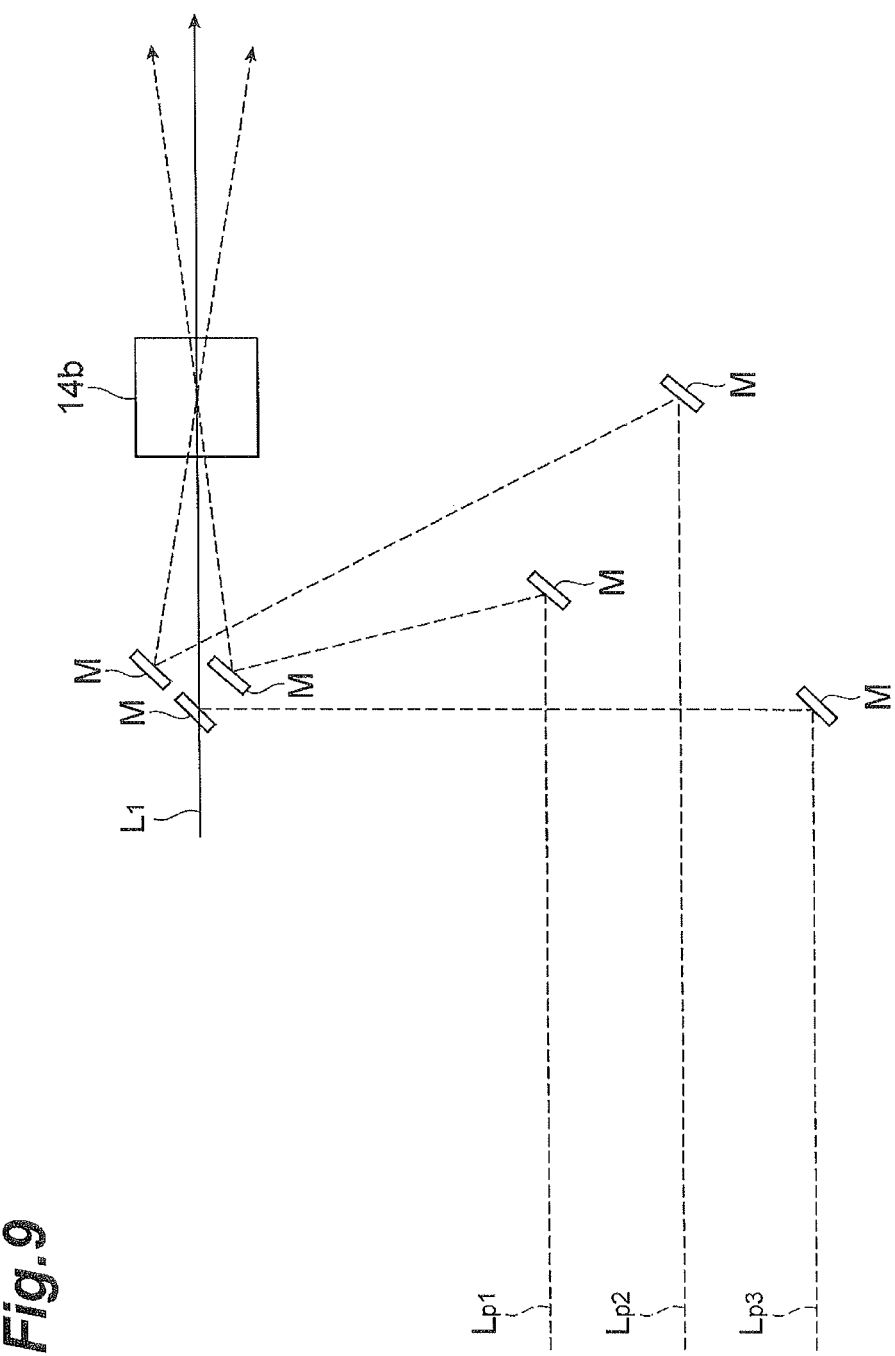
FIG. 9 is a diagram for explaining a modified example of the laser device illustrated in FIGS. 2 and 7.

In the laser devices 1, 1A, as illustrated in FIG. 9, the amplifier 14 may make a plurality of beams of pumping light $L_p$ (pumping light beams $L_{p1}$ to $L_3$ here) incident on the nonlinear crystal 14b for one beam of the laser light $L_1$. When the plurality of beams of pumping light $L_p$ have wavelengths different from each other, their optical paths are adjusted by mirrors M such that each beam of the pumping light $L_p$ attains a predetermined phase-matching angle, since it is necessary for the beams of pumping light $L_p$ to satisfy a phase-matching condition. Thus amplifying one beam of the laser light $L_1$ by using a plurality of beams of the pumping light $L_p$ allows the amplified laser light $L_2$ to have a higher output.

Figure 10:
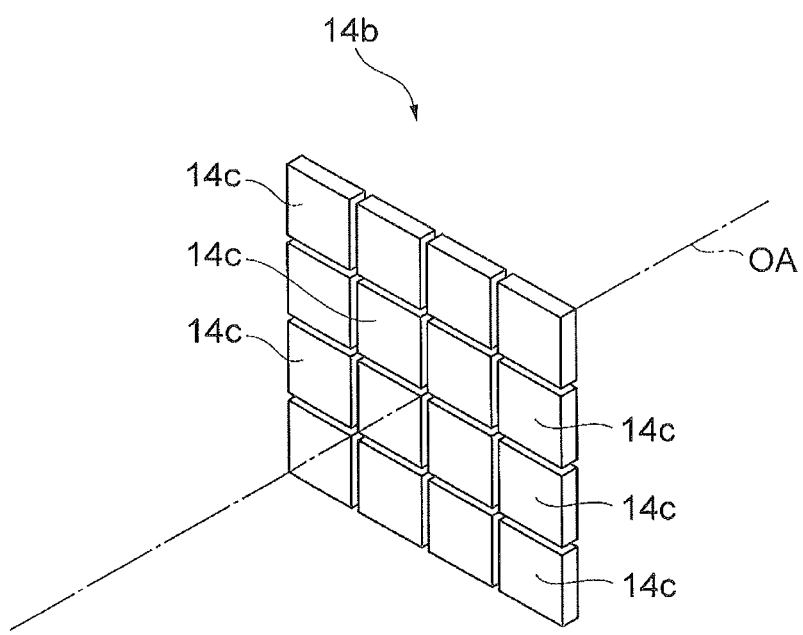
FIG. 10 is a diagram for explaining a modified example of the laser device illustrated in FIGS. 2 and 7.

In the laser devices 1, 1A, the nonlinear crystal 14b of the amplifier 14 may have a plurality of nonlinear crystal parts 14c as illustrated in FIG. 10. Here, a plurality of nonlinear crystal parts 14c are arranged into a matrix along a plane orthogonal to an optical axis OA. Each nonlinear crystal part 14c is cut at such an angle that the laser light $L_1$ and the pumping light $L_p$ satisfy a phase-matching condition. In this case, a plurality of beams of the pumping light $L_p$ are made incident on the nonlinear crystal 14b along the optical axis OA for each nonlinear crystal part 14c (or for each group of a plurality of nonlinear crystal parts 14c). One beam of the laser light $L_1$ is made incident on the nonlinear crystal 14b along the optical axis OA such as to cover a plurality of nonlinear crystal parts 14c on which a plurality of beams of the pumping light $L_p$ are incident. Such a structure allows the amplified laser light $L_2$ to have a higher output by increasing the number of nonlinear crystal parts 14c, even when the intensity of the pumping light $L_p$ incident on each nonlinear crystal part 14c is adjusted so as to prevent laser damages from occurring in the nonlinear crystal parts 14c.

When a peak intensity of the multiplexed light $L_3$ exceeds a damage threshold of the diffraction grating 16 in the laser devices 1, 1A, the focal length $f_2$ of the lens 15 may be made several times longer than the focal length $f_1$ of the lens 13, so as to lower the peak intensity of the multiplexed light $L_3$ on the diffraction grating 16.

The laser devices 1, 1A may use a mode-locked oscillator or a semiconductor laser under high speed current modulation as the laser light source 10. This can reduce the size, weight, and power consumption of the laser device. It can also improve the mechanical stability of the laser device. It can further cut down the manufacture cost of the laser device.

INDUSTRIAL APPLICABILITY

The present invention can provide a laser device which can produce pulsed laser light with a high output.

REFERENCE SIGNS LIST 1, 1A: laser device; 10: laser light source (oscillation means); 12: diffraction grating (demultiplexing means); 14: amplifier (amplification means); 14a: pumping light source; 14b: nonlinear crystal; 14c: nonlinear crystal part; 15: lens (demultiplexing means); 16: diffraction grating (multiplexing means); 17: phase control unit (phase control means); 22: frequency modulator (frequency difference adjustment means); $L_1$, $L_2$: laser light; $L_3$: multiplexed light; $L_p$: pumping light

The invention claimed is:

1. A laser device comprising:

oscillation means for oscillating a laser pulse train constituted by a plurality of beams of continuous laser light having frequencies different from each other;

demultiplexing means for demultiplexing the laser pulse train oscillated from the oscillation means into a plurality of beams of the continuous laser light having frequencies different from each other;

amplification means for amplifying each of the beams of the continuous laser light demultiplexed by the demultiplexing means;

multiplexing means for multiplexing at a predetermined position the beams of the continuous laser light amplified by the amplification means, so as to produce multiplexed light; and phase control means for controlling a phase of each of the beams of the continuous laser light such that an output peak of the multiplexed light repeatedly appears at the predetermined position at a predetermined time interval;

wherein the amplification means includes a pumping light source for oscillating pumping light and a nonlinear crystal for receiving each of the beams of the continuous laser light and the pumping light and makes each of the beams of the continuous laser light and the pumping light incident on the nonlinear crystal such as to satisfy a phase-matching condition of optical parametric amplification, thereby amplifying each of the beams of the continuous laser light.

2. A laser device according to claim 1, wherein the amplification means makes the pumping light incident on the nonlinear crystal as convergent light or divergent light.

3. A laser device according to claim 1, wherein the amplification means makes a plurality of beams of the pumping light incident on the nonlinear crystal for one beam of the continuous laser light.

4. A laser device according to claim 3, wherein the nonlinear crystal includes a plurality of nonlinear crystal parts; and
wherein the amplification means makes one beam of the continuous laser light incident on the nonlinear crystal over a plurality of nonlinear crystal parts and a plurality of beams of the pumping light incident on the nonlinear crystal for each of the nonlinear crystal parts.

5. A laser device according to claim 1, wherein the oscillation means oscillates the laser pulse train constituted by beams of the continuous laser light having frequencies different from each other at a substantially fixed frequency interval.

6. A laser device according to claim 5, further comprising frequency difference adjustment means for adjusting a frequency difference between beams of the continuous laser light constituting the laser pulse train oscillated from the oscillation means.

7. A laser device according to claim 1, wherein the oscillation means is a mode-locked oscillator or a semiconductor laser under high speed current modulation.

8. A laser device according to claim 1, wherein the phase control means measures a spectral phase of the multiplexed light and controls respective phases of beams of the continuous laser light according to a result of the measurement.

9. A laser device according to claim 4, wherein the oscillation means is a mode-locked oscillator or a semiconductor laser under high speed current modulation.

10. A laser device according to claim 4, wherein the phase control means measures a spectral phase of the multiplexed light and controls respective phases of beams of the continuous laser light according to a result of the measurement.

* * * * *